(12) United States Patent
London et al.

(10) Patent No.: US 8,370,510 B2
(45) Date of Patent: Feb. 5, 2013

(54) REMOTE APPLICATION PRESENTATION OVER A PUBLIC NETWORK CONNECTION

(75) Inventors: Kevin S. London, Monroe, WA (US);
Travis M. Howe, Bellevue, WA (US);
Ido Ben-Shachar, Kirkland, WA (US);
Ruiquing Zhu, Kirkland, WA (US);
Ersev Samim Erdogan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/642,720

(22) Filed: Dec. 18, 2009

(65) Prior Publication Data

US 2011/0153853 A1  Jun. 23, 2011

(51) Int. Cl.
*G06F 15/16* (2006.01)
(52) U.S. Cl. ........ 709/229; 709/201; 709/203; 709/219; 709/225; 707/781; 726/2
(58) Field of Classification Search .................... 709/229
See application file for complete search history.

(56) References Cited

U.S. PATENT DOCUMENTS

| | | | |
|---|---|---|---|
| 6,950,991 B2 * | 9/2005 | Bloomfield et al. | 709/227 |
| 7,290,288 B2 * | 10/2007 | Gregg et al. | 726/28 |
| 7,954,150 B2 * | 5/2011 | Croft et al. | 726/21 |
| 2002/0129239 A1 * | 9/2002 | Clark | 713/153 |
| 2006/0031942 A1 * | 2/2006 | Jones et al. | 726/27 |
| 2007/0180493 A1 * | 8/2007 | Croft et al. | 726/2 |
| 2007/0198656 A1 * | 8/2007 | Mazzaferri et al. | 709/218 |
| 2007/0260738 A1 * | 11/2007 | Palekar et al. | 709/229 |
| 2008/0155647 A1 * | 6/2008 | Miyawaki et al. | 726/1 |
| 2008/0263052 A1 * | 10/2008 | Parsell et al. | 707/10 |
| 2008/0263625 A1 * | 10/2008 | Gomez et al. | 726/1 |
| 2008/0279200 A1 * | 11/2008 | Shatzkamer et al. | 370/401 |
| 2011/0153853 A1 * | 6/2011 | London et al. | 709/229 |

FOREIGN PATENT DOCUMENTS

WO   WO 2009/111799   9/2009

OTHER PUBLICATIONS

Basumallik, A. et al., "iShare—Bringing the TeraGrid to the User's Desktop," 2006, 4 pages, http://cobweb.ecn.purdue.edu/~basumall/papers/idata.pdf.
Haupt, T. et al., "The Gateway System: Uniform Web Based Access to Remote Resources," 1999, 14 pages, http://aspen.ucs.indiana.edu/CandCPandE/jg99papers/C426JGFSIhaupt/JavaGrande99-submit.pdf.
"Remote Desktop Connection 7 for Windows 7, Windows XP & Windows Vista Overview," 2009, 4 pages, http://www.ervik.as/index/php/microsoft-mainmenu/med-v-mainmenu/2125-remote-desktop-connection-7-for-windows-7-windows-xp-a-windows-vista.

* cited by examiner

*Primary Examiner* — Thomas Dailey
*Assistant Examiner* — Neeraj Utreja
(74) *Attorney, Agent, or Firm* — Woodcock Washburn LLP

(57) ABSTRACT

Web access over a public network for applications that operate on virtual desktops on a plurality of servers is facilitated. Through the web access the user is provided with the information necessary to establish a connection with an application by way of the virtual desktop. Applications that the user is authorized to access are determined and those applications that the user is not authorized to access are filtered out. The applications associated access control list is used for determining the user's access to discover an application.

16 Claims, 6 Drawing Sheets

REMOTE APPLICATION PRESENTATION OVER A PUBLIC NETWORK CONNECTION

BACKGROUND

Remote computing systems may enable users to access resources hosted by the remote computing systems. Servers on the remote computing systems can execute programs and transmit signals indicative of a user interface to clients that can connect by sending signals over a network conforming to a communication protocol such as the TCP/IP protocol. Each connecting client may be provided a session, i.e., an execution environment that includes a set of resources. Each client can transmit signals indicative of user input to the server and the server can apply the user input to the appropriate session. The clients may use protocols such as the Remote Desktop Protocol (RDP) to connect to a server resource. Protocols such as RDP typically handle graphics, device traffic such as USB, printer keyboard and mouse and in addition, virtual channels for application between server and a client. The terminal server hosts client sessions which can be in the hundreds in a typical server configuration.

Enabling remote connections to centralized desktops hosted in virtual machines is commonly used for centralized computing scenarios. Deployment of virtual desktops requires load balancing of host computers that host virtual machines, placement of virtual machines on the hosts, and properly orchestrating the startup, wake up, and preparation of virtual machines for receiving connections.

The systems described above generally require that the user computer have a preinstalled client that assists the user in the process of connecting to the remote server and communicating with the remote server over a virtual private network (VPN). In some instances, it would be beneficial to allow a user to connect to similarly connect to remote resources by way of a web browser. However, previous systems that provided users ability to launch remote application programs and desktops through a web page (Remote Desktop Web Access) presented a wide assortment of resources to the users that user may not want to see or the administrators may not want them to see.

SUMMARY

Aspects of the invention are embodied in a system, methods, and computer-readable media that are adapted to connect a client computing device to one of a plurality of virtual machines executing on a plurality of servers. A web access module receives a request from a user over a public network for applications that operate on virtual desktops on a plurality of servers. The user is provided with the information necessary to establish a connection with application by way of the virtual desktop.

The applications that the user is authorized to access are determined based on the user identification. Preferably, a broker module makes the determination and filters out those applications that the user is not authorized to access. In an embodiment, the broker module issues a query to a directory to determine whether the user is associated with a group that is authorized to access at least one application. The applications have an associated access control list that is used for determining the user's access to the application.

DETAILED DESCRIPTION OF ILLUSTRATIVE EMBODIMENTS

Figure 1:
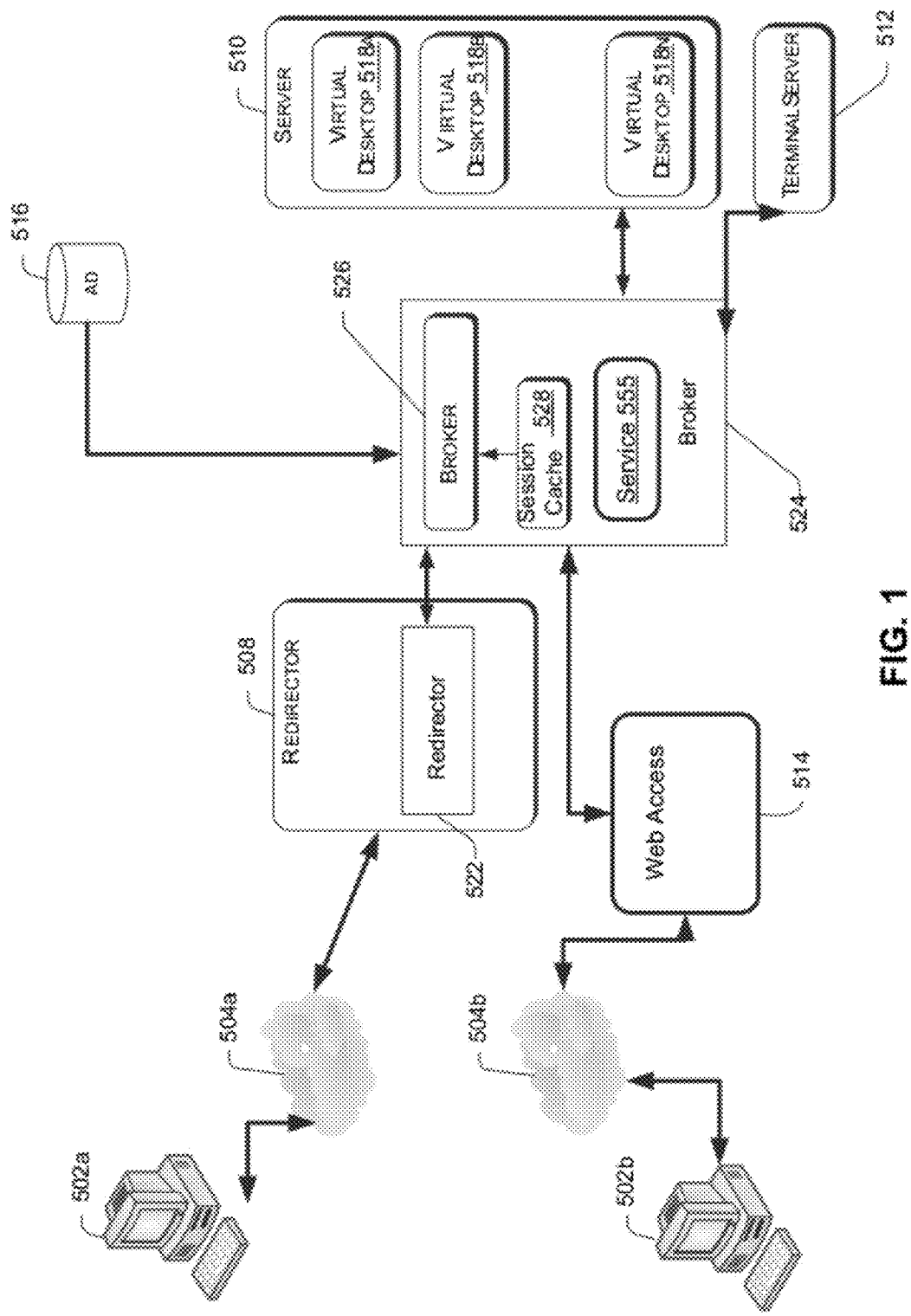
FIG. 1 depicts an operational environment for practicing aspects of the invention.

Certain specific details are set forth in the following description and figures to provide a thorough understanding of various embodiments of the inventions. Certain well-known details often associated with computing and software technology are not described in the following disclosure for the sake of clarity. Furthermore, those of ordinary skill in the relevant art will understand that they can practice other embodiments of the disclosed subject matter without one or more of the details described below. While various methods are described with reference to steps and sequences in the following disclosure, the description as such is for providing a clear implementation of embodiments of the disclosed subject matter, and the steps and sequences of steps should not be taken as required to practice the invention.

It should be understood that the various techniques described herein may be implemented in connection with hardware or software or, where appropriate, with a combination of both. Thus, the methods and apparatus disclosed herein, or certain aspects or portions thereof, may take the form of program code (i.e., instructions) embodied in tangible media, such as floppy diskettes, CD-ROMs, hard drives, or any other machine-readable storage media that may be loaded into and executed by a machine, such as a computer. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosed subject matter, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The following described systems and methods for a web service for remote application discovery substantially simplify a remote client's experience when accessing applications through a browser or other web based interface. An organizational entity is enabled to more easily publish remote applications using a variety of information source mechanisms and then provide a single aggregated view of the applications to remote clients over a public network that are filtered based on a particular user.

More specifically, an entity in an organizational network installs, or deploys some number of applications on servers and/or end-user computing devices in the corporate network. For instance, an administrative entity may install an application on a corporate server for remote terminal services (TS)-based access or on a virtual machine via a remote desktop (RD). The administrative entity creates associations between the deployed/applications and specific user(s), group(s) of users, and/or specific client computing device(s). These associations are then stored in one or more databases/information sources.

A remote client device, independent of whether it is outside of the corporate firewall, connected to the corporate network over a Virtual Private Network (VPN), and/or so on, discovers these applications via a web service deployed on a public network such as the Internet. In one implementation, an end-user of the remote client device uses a web browser or user interface shell to discover/enumerate each application associated with the remote client device or the end-user.

After identifying one or more applications configured for remote access, the service aggregates each identified application and its intranet installation point into a single comprehensive list of applications. The aggregated list is sent to the requesting remote client device for presentation, for instance, as shortcuts in a user interface (UI) shell, a Web browser window, and/or so on. Since the presented shortcuts represent an aggregate of the remotely deployed applications over one or more application sources, it is completely transparent to the end-user whether the shortcuts are coming from a single source (installation point) or from multiple disparate information sources. In this manner, authorized users may seamlessly discover and use applications deployed on terminal server (TS) farms, remote desktop farms (RD) farms, and/or on their office computer from a remote location. By presenting such shortcuts via UI shell, the end user is provided with seamless access to corporate resources deployed across any number of remote servers and/or desktops.

As described above, aspects of the invention are relevant to a remote desktop that execute in a virtualized computing environment. In such a virtualized computing environment, a plurality of virtual machines, each having an independent operating system, operate on the same underlying hardware. Access to the underlying physical hardware by each virtual machine is governed by a virtualizing management program that is sometimes referred to as a virtual machine monitor. A variation of a virtual machine monitor is referred to as a hypervisor.

In some instances, a user may desire to access computing applications remotely, i.e., applications that are running on a separate computing device. One implementation provides a user with such access through a virtual remote desktop. A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP), HTML, XML, or even a combination thereof) to an application on a server. The application processes the input as if the input were entered at the server.

In a further detailed illustration of a remote computing environment, a connection broker controls the allocation of sessions to users communicating in a remote access system environment. A broker allocates a session to a user based on session state information stored in the broker. Session state information may include, for example, session IDs, user names, names of the servers where sessions are residing, the number of active sessions in each server computer, and so on. As used herein a session may be a virtual desktop session or a terminal services session.

In a remote access system environment, there may be more than one server computer that can service a particular user. As such there is a redirection process that determines where to send a request from a remote computing device that is attempting to connect to a server. In some instances, the remote computing device may first connect to a redirector that provides load balancing, etc. of clients. In such a case, a redirection server typically first receives the request for a connection. The redirection server then accepts the connection request and queries the connection broker to determine where the user can be redirected. The connection broker analyzes the session state information of that particular environment and identifies a server to which the user can be redirected. The identified server may possess a session previously accessed by the user, but later disconnected, to which the user can be reconnected again. In an embodiment, an identified server may provide a new session to which the user can be connected, provided the user does not possess any other existing sessions.

The broker can then send information to the redirecting server which in turn returns the information to a client to enable the client to establish a connection with the identified server. For example, the information may include a machine ID, a session ID, and location of the identified server. The redirecting server analyzes the information received and redirects the user to the identified server. Once the user establishes the connection with the identified server, the user can access applications present in the identified server.

In some instances, the client computer is directly connected to a virtual desktop. In other instances and according to an aspect of the invention, the client computer connects to a web access server, which in turn establishes the connection to the server computer on behalf of the client. When the client connects directly to the remote desktop, the client computer indicates an identifier such as pool name that is used by the broker to generate an internet protocol (IP) address to establish connection between the client computer and the virtual desktops. Since the individual virtual desktop IP address is not known until the VM is orchestrated (woken up, started, etc), only a single network name of the redirector is initially required to be externally exposed to the clients. The construction of the virtual desktop and terminal services integration system and an environment in which this integration system may be enabled by techniques is set forth first below with reference to the figures.

FIG. 1 provides an overview of a system that illustrates an example embodiment of aspects of the invention. FIG. 1 illustrates two connections to a remote desktop. Client computing devices (502*a* and 502*b* depicted here) remotely access services over public networks 504*a* and 504*b*, respectively. In one instance, client computing device 502*a* is connected to via public network 504*a* to a redirector device 508 that, in turn connects it to broker 524 which provides the ability to connect to virtual desktop server 510 and terminal server 512. The redirector facilitates the connection of computing device 502*a* with a virtual desktop 518A-518N on Server 510 or with terminal server 512. Client computing device 502*a* in that instance is executing client software in order to establish the remote presentation connection with the terminal server 512 or one of the remote desktops 518A-518N. Preferably the broker is in a private network behind a firewall.

In the example connection most relevant to aspects of the invention, a user operating computing device 502*b* may also connect to broker 524 and access services provided by the broker via web access 514. In that instance, client computing device 502b using a client UI, for example, a web browser such as MICROSOFT INTERNET EXPLORER, MOZILLA FIREFOX, etc. can connect via public network 504b to a remote application server 514, which may not be behind a firewall and can be reached by way of a browser. Of course, Remote application server 514, Redirector 508, and Broker 524 may be operating on the same physical hardware. Client device 502b may be any computing device capable of communicating with a network 504b. In one embodiment, the client devices 502b is a general purpose desktop computing device that is connected to the network 504b. The client devices may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth. Network 504b may be any type or combination of communications networks, such as a local area network, wide area network, cable network, the internet, the World Wide Web or a corporate enterprise network.

Broker module 524 may include a connection broker module 526 and a session cache module 528 that tracks the states of session in terminal server 512 and/or the virtual desktops on server 510.

Server 510 is a host server that hosts a plurality of virtual remote desktops each of which typically operates in a separate virtual machine. A typical enterprise deployment may have a plurality of host servers each having a plurality of virtual desktops. Server 510 includes a plurality of virtual desktops 518 (a-n), which are essentially individual session operating on virtual machines as described above. Broker 524 receives from server 510 an indication of which virtual desktops 518(a-n) are available. Broker 526 also receives session cache information 528 indicating which sessions are currently active for various virtual desktops 518(a-n). In one embodiment, connection broker 526 may indicate to remote application server 514 that it may connect to terminal server 512 or a virtual desktop 518A-518N. In this embodiment, the broker maintains a list of the names of the virtual desktops and the corresponding IP address of the virtual desktop 518. Thus when an identifier is provided with a client request, the broker determines a connection that can be established between remote application server 514 and the corresponding virtual desktop 518.

Figure 2:
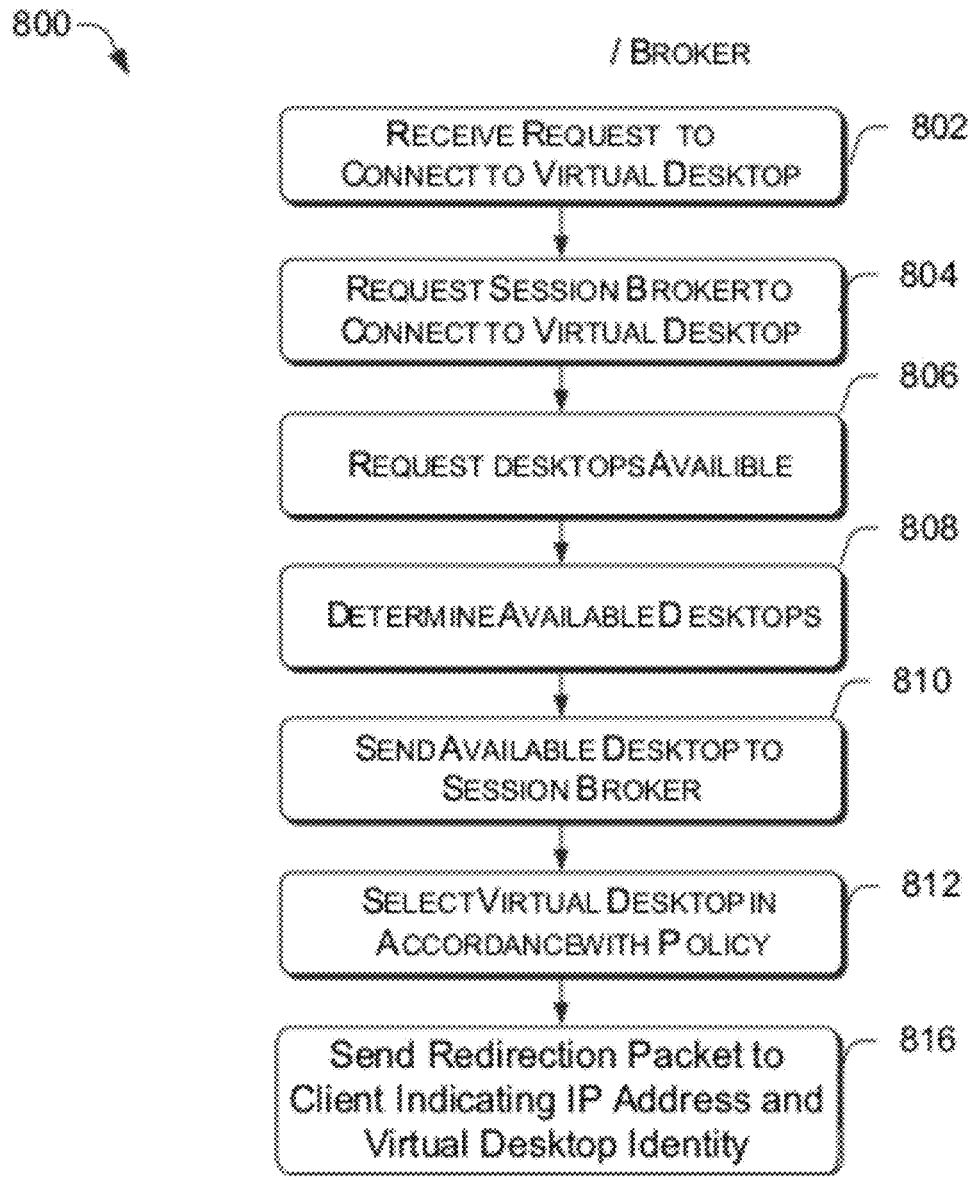
FIG. 2 illustrates a flow diagram of an example process operating on a broker device for connecting and transferring content between a client device and the virtual desktop.
Figure 3:
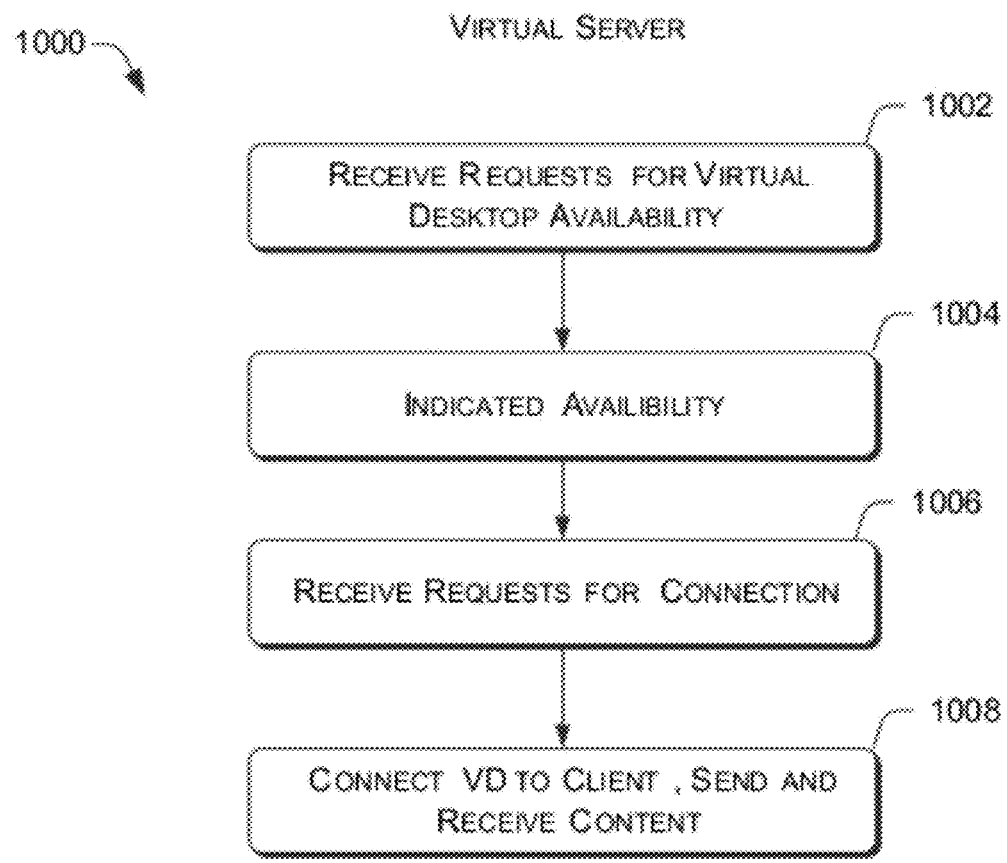
FIG. 3 illustrates a flow diagram of an example process executed with a server device for connecting and transferring content between the client device and the virtual desktop.

The flow diagram in FIG. 2 depicts exemplary processes 802-816 used by redirector device 508 and broker 524 and represents a sequence of operations that can be implemented in hardware, software, and a combination thereof. A similar process applies to the remote application server 514 request a virtual desktop from broker 524. The flow diagram in FIG. 3 depicts exemplary processes 1002-1008 used by server 510 to communicate the available remote virtual desktops that are available and additionally represents a sequence of operations that can be implemented in hardware, software, and a combination thereof. In the context of software, the blocks represent computer-executable instructions that, when executed by one or more processors, cause the recited operations to occur.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIG. 1, although it may be implemented in other system architectures.

In more detail, FIG. 2 illustrates a flow diagram of an exemplary process 800 used by a redirector device 508 and broker 524 to connect a device, e.g., client device 502a or remote application server 514 with a virtual desktop 518 or terminal server 512. At block 802, a request is received from the device to connect to one of the virtual desktop 518(a-n). The request may include the name of the requesting user and an identifier such as virtual desktop pool or personal desktop. Such a request may be first received by the redirector 522 and is sent to connection broker 526 in block 804. In block 806, the connection broker transmits a request to various host servers, e.g., 510 requesting available virtual desktops. The actions of block 806 may have been performed at an earlier time and cached at broker 524. In block 808, broker 524 determines which virtual desktops 518(a-n) are available, by polling the virtual desktops or by reading a table stored in memory that tracks the virtual desktop availability. In one embodiment, the broker 524 may determine that the terminal server 552 is available for transmitting and receiving content. In block 810, host servers 510 provides a notification of virtual desktop availability to connection broker 526. Again this step may have previously occurred and have been cached by the broker 526.

In block 812, the connection broker 526 reads a table in policy module 528 indicating which of the virtual desktops 518(a-n) may be used with a particular client device 502. Such elements of the table may be set by an administrator. In accordance with the table, the virtual desktop 518 is selected and, preferably, the IP address for the virtual desktop 518 and identity (machine name) is provided. The Redirector 522 or the broker 524 then sends the IP address and the corresponding name to the requesting device. In block 816, a redirection packet is sent to the device along with the virtual desktop identity so that the device can connect directly to the virtual desktop and authenticate the connection.

In order to connect with a virtual desktop 518 or terminal server 512, the device, e.g., client 502a or remote application server 514, performs action such as the following. A request is made to connect to one of the virtual desktops 518(a-n). The requesting device may receive an acknowledgment and a token in a packet, preferably an RDP packet, indicating an IP address and a name of the virtual desktop that the device will use to connect to and authenticate with a virtual machine. The device may indicate that name when connecting to the virtual desktop 518.

FIG. 3 illustrates a flow diagram of an exemplary process 1000 used by server 510, e.g. a VM host, to initiate a connection to client device, e.g., client device 502a or remote application server 514. At block 1002, the server 510 receives requests for virtual desktop 518 availability. In block 1004, the server 510 polls its virtual desktops, and feeds an availability indication to requesting device. In block 1006, the server 510 receives requests for connection between one of the virtual desktops 518 and one of the client devices. The request may include the IP address of the requested virtual desktop. In block 1008, server 510 indicates that a connection has been established. Further, server 510 both sends content to and receives content from the client device.

As an alternative to the remote connection process illustrated with respect to client computing device 502a and in accordance with an aspect of the invention, a remote connection process can also be established by the embodiment illustrated with respect to client computing device 502b. In that embodiment, client computing device 502b connects to remote application server 514. For example, the user may enter www.mycompany.com into the address on a web browser that will direct the browser to a web page. When client computing device 502*b* connects to remote application server 514, for example through an XML feed and HTML pages, the logs in and a user security identifier SID is determined for the user that authenticates the user of that computing device to remote application server 514. In the case of Windows based authentication this is done by impersonating the user. For form based authentication, the SID can be written inside a cookie, for example, that is passed to remote application server 514. As noted above, the connection between the remote application server and the virtual desktop is similar to the process described with respect to FIGS. 2 and 3 with the remote application server 514 acting essentially as a proxy on behalf of client device 502*b*. Although FIG. 1 illustrates remote application server 514 communicating with connection broker 524, alternatively, remote application server may communicate directly with multiple RD session hosts, e.g., directly to server 510 and other similarly configured servers.

In the embodiment in which remote application server 514 communicates with connection broker 524, broker 524 preferably assists with filtering of user resources even if the remote application server 514 is located in an untrusted domain or DMZ. The user SID is passed as an argument to a service 555 on the connection broker that manages the remote applications and desktop connections. Service 555 determines what personal virtual desktop is assigned to a user preferably by way of an LDAP query to the system active directory. An administrator would have previously assigned a virtual personal desktop to the user based on the SID. In a preferred embodiment, the filters are added to service 555 by way of a plugin. The information returned from the LDAP query can be used to create a unique remote desktop protocol (RDP) file for the user that is set as the resource and passed back to service 555.

Additionally, connection broker 524 maintains a list of Remote Desktop session hosts (RDSH). In one embodiment, the list of Remote Desktop session hosts, e.g., server 510, are be queried, for example, through a Windows Management Information call (WMI). The WMI calls return the name of the remote application program, the icon associated with it, an RDP file for connecting to the remote application and a security access control list (ACL). The returned resources are then saved into cache and the process is repeated for all the resources returned from the session hosts. In one embodiment, a Security context is created using the user's SID to check whether a user has access to a particular security ACL without impersonating the user. Using the context each remote application program security ACL is checked. As part of that check, the AD is checked and the various groups that the user is a member are also enumerated to determine if the user should be given access to the remote application program as part of a group. If the user should have access to the remote application program then, preferably, the information is put in a buffer that will be passed back to service once all resources that were returned from the session hosts are enumerated and checked for access. Notably, this embodiment checks for AD changes and supports AD groups in general.

Once all the resources are determined, the information is returned (e.g., in response to a remote procedure call initiated by remote application server 514). Remote application server 514 then can create a webpage with the resources for the user or, alternatively, by way of an XML feed. Notably, only the resources associated with the user are returned to remote application server 514 for the requesting user. As such, other remote applications on an enterprise system that may be available for other users or groups of users are not available and discoverability can be more easily managed and controlled by a system administrator.

As noted, the remote application server 514 may connect directly to multiple session hosts (e.g., server 510) as opposed to connecting to connection broker 524. In this alternate embodiment, remote application server 514 will perform the filtering of resources as opposed to the connection broker. Preferably, remote application server 514 caches ACL's that a user has had access to. In that embodiment, if an access check has already been performed, then a determination can be made to regarding user access to a given remote application. Once the list has been filtered this is passed up and only the resources that the user should be able to discover are used to create an HTML or XML feed. This once again provides that only resources the user should be able to discover are available (i.e., they are not hidden within the page).

Figure 4:
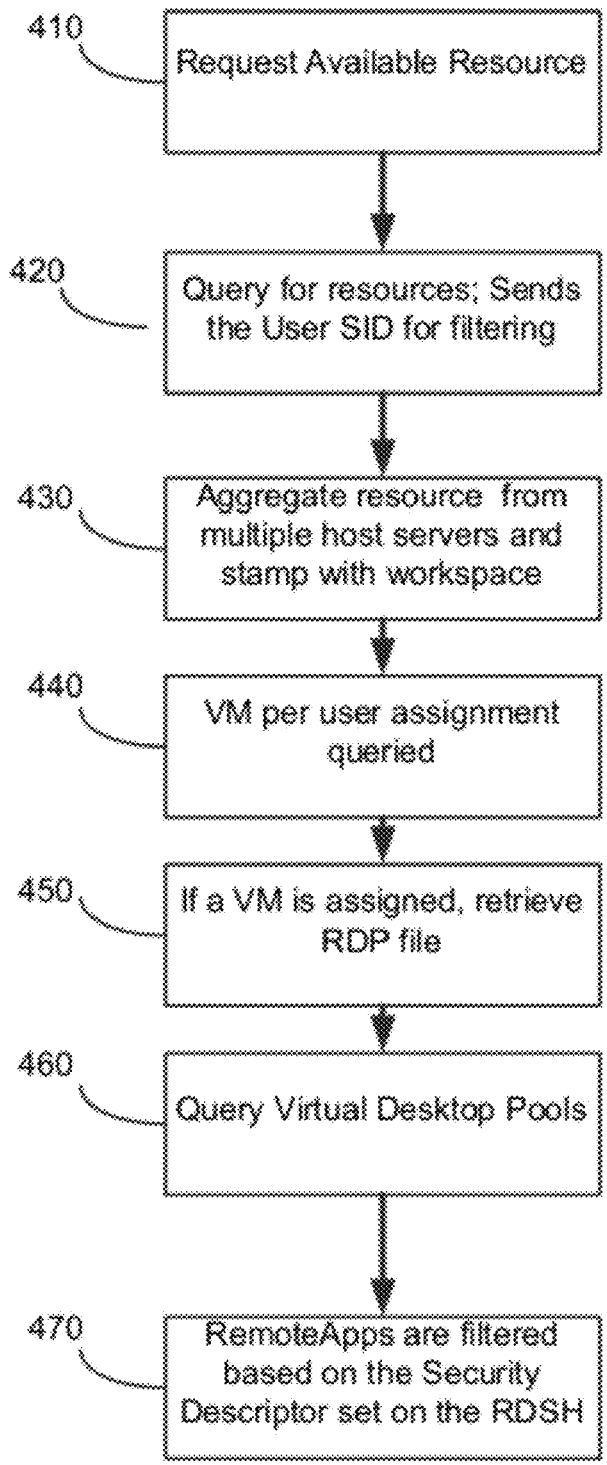
FIG. 4 illustrates a flow diagram illustrating an example process for filtering remote applications on a per user basis in accordance with an aspect of the invention.

FIG. 4 further illustrates the actions that are performed when client device 502*b* connects to remote application server 514. At block 410, client device 502*b* makes a request to remote application server 514 for available resources. In the process, client device 502*b* provides remote application server 514 with the user's SID. At block 420, remote application server 514 sends a query for resources to broker 524 along with the user SID so that the resources available for the user can be filtered. The broker 524 then aggregates the resources from the various host servers, e.g., 510 at block 430 as described more fully above. Connection broker 524 queries the AD at block 440 to determine the virtual machines that are assigned to a user. At block 450, if a virtual machine is assigned to the user, the remote desktop protocol file is retrieved for the assigned virtual machine. The virtual desktop pools in the cache of broker 524 are then queried at block 460. And the remote applications are filtered based on the security descriptor that was set on the host server 510 for a given remote application at block 470. The set is then returned to the user via HTML or XML for example.

The client computing device 502*b* can then download from remote application server 514 an application to connect to the remote desktop using RDP and connect to the virtual machine in a manner similar to that described above with respect to client device 502*a*.

As noted, the embodiments described provide ease of administration as well. For example, the assignment for which user should be presented with a resource (via remote application server 514) is preferably performed on the server on which the remote applications are installed. This means that an administrator will be able to install and publish the applications and at the same time set which users should have remote access to them. In addition the assignment can be done remotely through an admin tool or WMI. If an administrator wants to assign users using WMI, they need only create a script that gets the remote application program that they want to assign users to and create a security ACL with the permissions that are desired, assign it to the WMI object and put the WMI object back.

Figure 5:
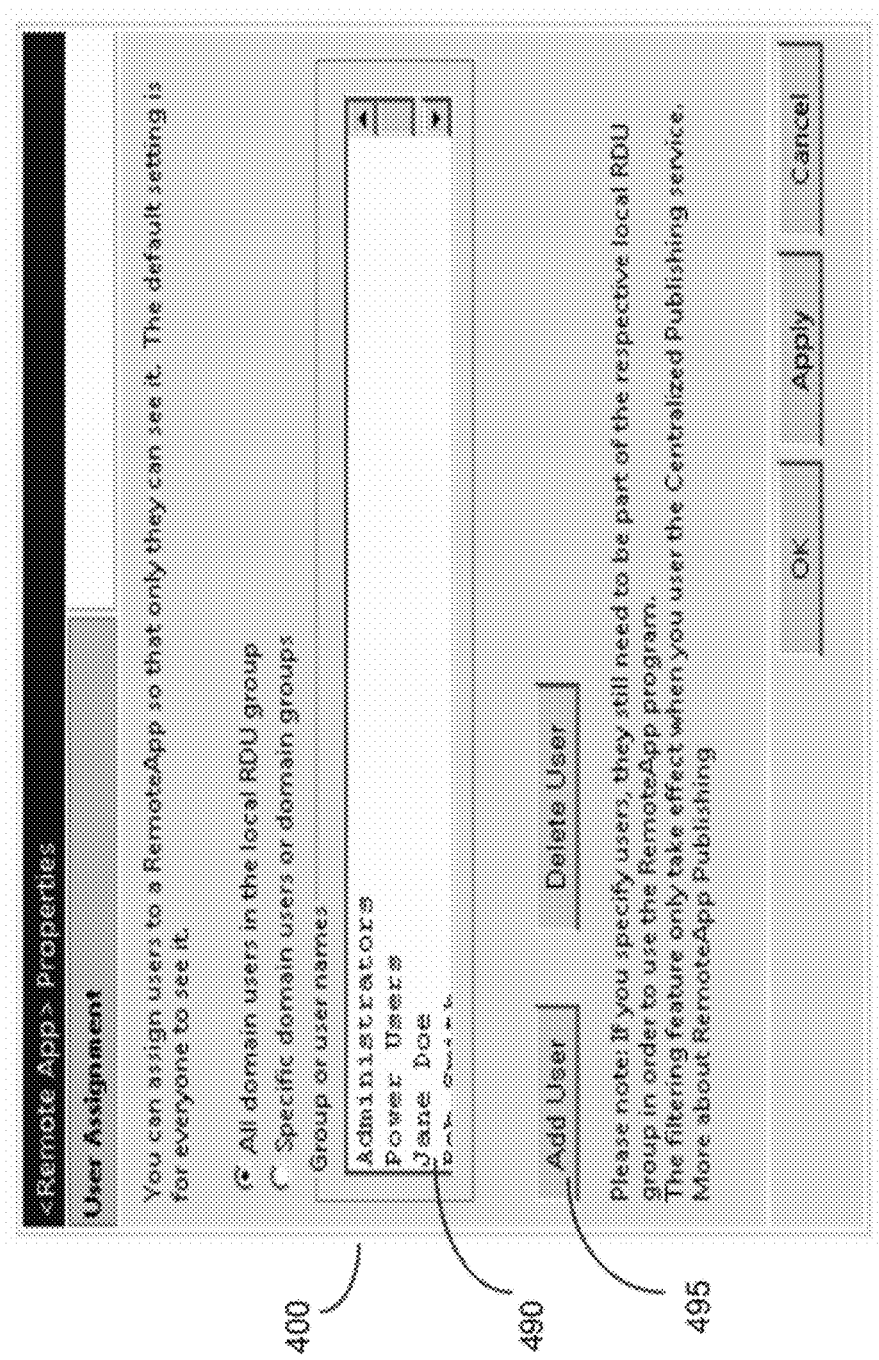
FIG. 5 illustrates an example UI for filtering assigning users to remote applications in accordance with an aspect of the invention.

Alternatively, a UI may be used to assign a user to a remote application program, using a remote application manager tool. FIG. 5 provides an illustration of an example of a portion of UI for such a tool. In the tool, an administrator can review a list of programs that are currently published. They can select any remote application program and then select properties. Preferably, a properties dialog box 400 is presented (as shown in FIG. 5) along with a User Assignment tab. After selecting the User Assignment tab, an administrator can add any domain user or group from box 490 to that RemoteApp program by selecting Add User button. Multiple names can be assigned to the same remote application program. When they click apply the UI tool creates a security ACL and writes it back via WMI for that particular remote application program. From that point on that program will only be discoverable by users that have access to that ACL.

Any of the above mentioned aspects can be implemented in methods, systems, computer readable media, or any type of manufacture. For example, a computer readable medium can store thereon computer executable instructions for connecting a remote client computer to one of a plurality of virtual machines executing on a plurality of servers.

Figure 6:
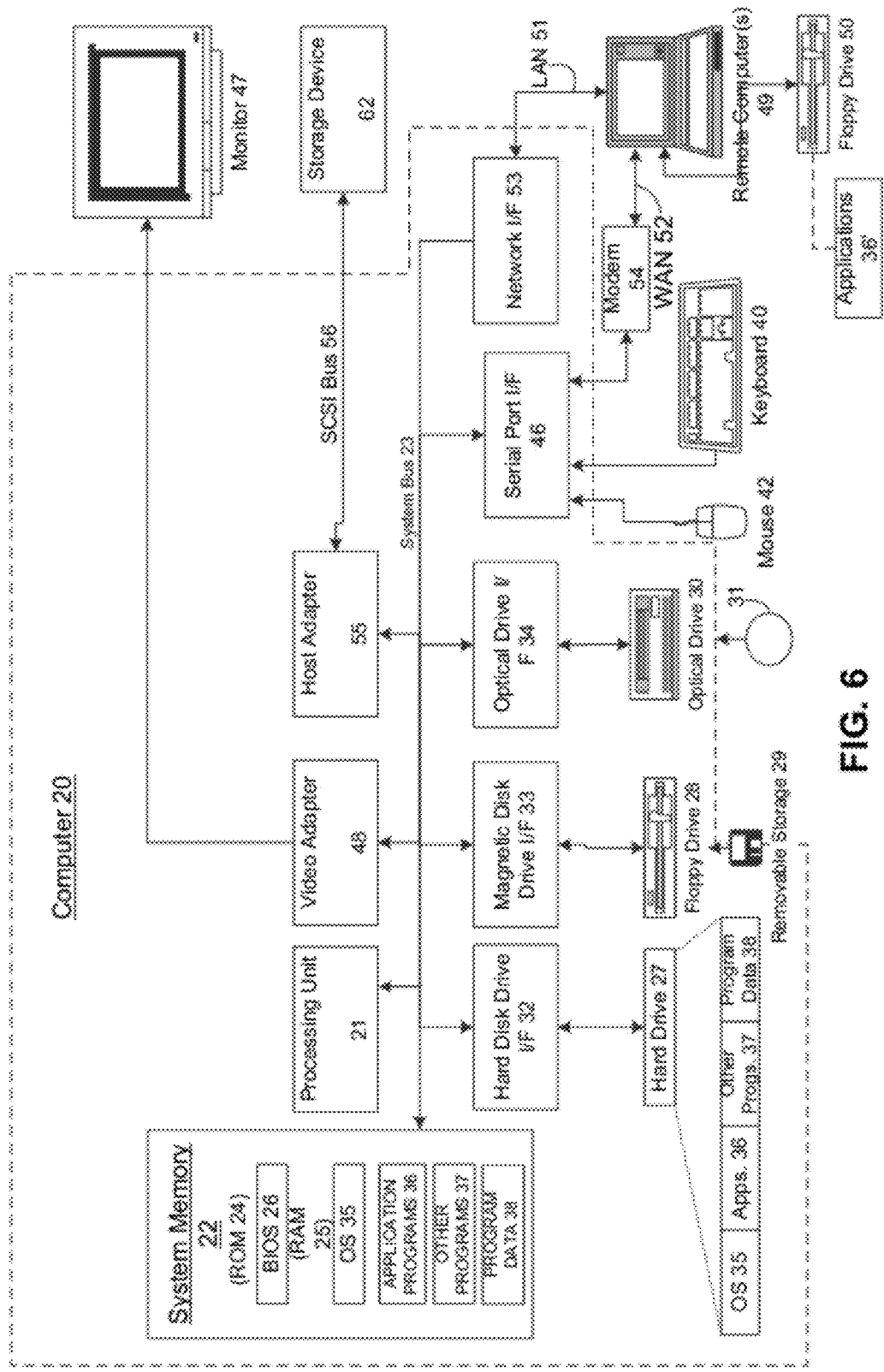
FIG. 6 depicts an example computer system in which aspects of the invention may be carried out.

As described above, aspects of the presently disclosed subject matter may execute on a programmed computer. FIG. 6 and the following discussion is intended to provide a brief description of a suitable computing environment in which those aspects may be implemented. One skilled in the art can appreciate that the computer system of FIG. 6 can in some embodiments effectuate the server and the client and processes of FIGS. 2-5. In these example embodiments, the server and client can include some or all of the components described in FIG. 6 and in some embodiments the server and client can each include circuitry configured to instantiate specific aspects of the disclosed embodiments.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 6 depicts an example of a computing system which is configured to with aspects of the disclosed subject matter. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosed subject matter may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 11 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the presently disclosed subject matter are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the subject matter described herein have been shown and described, it will be apparent to those skilled in the art that, based upon the teachings herein, changes and modifications may be made and, therefore, the appended claims are to encompass within their scope all such changes and modifications as are within the true spirit and scope of the subject matter described herein.

What is claimed:

1. A method comprising:
receiving at a first server a request over a public network from a user computer, the request including a user identification;
querying, by the first server, a directory service for an identity of a virtual machine on a second server that is assigned to the user identification;
in response to the query, receiving by the first server, a remote desktop protocol file from the directory service, the remote desktop protocol file corresponding to the virtual machine;
sending, by the first server, the remote desktop protocol file and the user identification to the second server;
identifying, by the second server, the virtual machine based on the remote desktop protocol file;
determining, by the second server, that the virtual machine is configured to execute a first application and a second application, the second server being configured to enumerate to the first server each application that the virtual machine is configured to execute in response to receiving a remote desktop protocol file;
sending, by the second server and to the first server, an indication that the virtual machine is configured to execute the first application and the second application;
determining, by the first server, that the user identification is authorized to access the first application, and not authorized to access the second application based on the indication that the virtual machine is configured to execute a first application and a second application; and
in response to determining that that the user identification is authorized to access the first application, and not authorized to access the second application, returning to the user computer an indicator for the first application but not the second application.

2. The method as recited in claim 1, further comprising:
providing, by the first server, an IP address to the user computer identifying the network location for the first application.

3. The method as recited in claim 1, wherein the request is an HTTP request.

4. The method as recite in claim 1, wherein the second server comprises a plurality of virtual machines.

5. The method according to claim 1, wherein determining that the user identification is authorized to access the first application, and not authorized to access the second application comprises:
comparing the user identification to an access control list associated with the first and second applications.

6. A computer-readable storage device having stored thereon computer-readable instructions that when executed by a computing device cause:
receiving at a first server a request over a public network from a user computer, the request including a user identification;
querying, by the first server, a directory service for an identity of a virtual machine on a second server that is assigned to the user identification;
in response to the query, receiving by the first server, a remote desktop protocol file from the directory service, the remote desktop protocol file corresponding to the virtual machine;
sending, by the first server, the remote desktop protocol file and the user identification to the second server;
identifying, by the second server, the virtual machine based on the remote desktop protocol file;
determining, by the second server, that the virtual machine is configured to execute a first application and a second application, the second server being configured to enumerate to the first server each application that the virtual machine is configured to execute in response to receiving a remote desktop protocol file;
sending, by the second server and to the first server, an indication that the virtual machine is configured to execute the first application and the second application;
determining, by the first server, that the user identification is authorized to access the first application, and not authorized to access the second application based on the indication that the virtual machine is configured to execute a first application and a second application; and
in response to determining that that the user identification is authorized to access the first application, and not authorized to access the second application, returning to the user computer an indicator for the first application but not the second application.

7. The computer-readable storage device as recited in claim 6, further comprising:
providing an IP address to the user computer identifying the network location for the first application.

8. The computer-readable storage device as recited in claim 6, wherein the indicator is an icon that is displayable on a web page.

9. The computer-readable storage device as recited in claim 6, further comprising computer-readable instructions that when executed by the computing device cause determining that the user identification is authorized to access the first application, and not authorized to access the second application further cause:
comparing the user identification to an access control list associated with the first and second applications.

10. A system adapted to connect a client computer to one of a plurality of virtual machines executing on a plurality of servers, comprising:
at least one computing device comprising a processor; and
at least one memory communicatively coupled to said at least one computing device when the system is operational, the memory having stored therein computer-executable instructions that when executed cause the system to at least:
receive at a first server a request over a public network from a user computer, the request including a user identification;
query, by the first server, a directory service for an identity of a virtual machine on a second server that is assigned to the user identification;
in response to the query, receive by the first server, a remote desktop protocol file from the directory service, the remote desktop protocol file corresponding to the virtual machine;
send, by the first server, the remote desktop protocol file and the user identification to the second server;

identify, by the second server, the virtual machine based on the remote desktop protocol file;

determine, by the second server, that the virtual machine is configured to execute a first application and a second application, the second server being configured to enumerate to the first server each application that the virtual machine is configured to execute in response to receiving a remote desktop protocol file;

send, by the second server and to the first server, an indication that the virtual machine is configured to execute the first application and the second application;

determine, by the first server, that the user identification is authorized to access the first application, and not authorized to access the second application based on the indication that the virtual machine is configured to execute a first application and a second application; and in response to determining that that the user identification is authorized to access the first application, and not authorized to access the second application, return to the user computer an indicator for the first application but not the second application.

11. The system as recited in claim 10, wherein the first server is configured to communicate with the user computer on a public network, and is configured to communicate with the second server on a private network behind a firewall.

12. The system as recited in claim 10, wherein the computer-executable instructions that, when executed, cause the system to at least return to the user computer the indicator for the first application but not the second application further cause the system to at least:

provide an IP address to the user computer identifying the network location for the first application.

13. The system as recited in claim 10, wherein the computer-executable instructions that, when executed, cause the system to at least receive at a first server a request over a public network from a user computer, the request including a user identification further cause the system to at least:

receive the request, the request including the user identification provided in a cookie.

14. The system as recited in claim 10, wherein the second server comprises a plurality of virtual machines.

15. The system as recited in claim 10, wherein the computer-executable instructions that, when executed, cause the system to at least determine, by the second server, that the user identification is authorized to access the first application, and not authorized to access the second application further cause the system to at least:

compare the user identification to an access control list associated with the first and second applications.

16. The system as recited in claim 10, wherein the computer-executable instructions that, when executed, cause the system to at least determine that the user identification is authorized to access the first application, and not authorized to access the second application further cause the system to at least:

receive, by the first server and from the second server the indicator for the first application and an indicator for the second application;

determine, by the first server, that the user identification is authorized to access the first application, and not authorized to access the second application based on an identification of applications that the user is authorized to access stored an access control list.

\* \* \* \* \*